(12) United States Patent
Zhao et al.

(10) Patent No.: US 11,909,780 B2
(45) Date of Patent: Feb. 20, 2024

(54) ENABLING VERTICAL APPLICATION LAYER SERVER FOR PEER-TO-PEER MEDIA PARAMETER NEGOTIATION

(71) Applicant: TENCENT AMERICA LLC, Palo Alto, CA (US)

(72) Inventors: Shuai Zhao, Pleasanton, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/858,323

(22) Filed: Jul. 6, 2022

(65) Prior Publication Data

US 2023/0025701 A1   Jan. 26, 2023

Related U.S. Application Data (60) Provisional application No. 63/219,306, filed on Jul. 7, 2021.

(51) Int. Cl.
*G06F 13/00* (2006.01)
*H04L 65/1069* (2022.01)
(Continued)

(52) U.S. Cl.
CPC ...... *H04L 65/1069* (2013.01); *H04L 65/1104* (2022.05); *H04L 65/61* (2022.05); *H04L 67/104* (2013.01)

(58) Field of Classification Search
CPC . H04L 65/1069; H04L 65/1104; H04L 65/61; H04L 67/104; H04L 65/612; H04L 65/75; H04L 65/80

(Continued)

(56) References Cited

U.S. PATENT DOCUMENTS

| | | | | |
|---|---|---|---|---|
| 8,493,937 B2 * | 7/2013 | Nix | ...................... | H04L 61/2564 370/331 |
| 2012/0281673 A1 * | 11/2012 | Nix | ................... | H04W 36/0033 370/331 |

FOREIGN PATENT DOCUMENTS

| | | | | |
|---|---|---|---|---|
| WO | 2021/001272 A1 | 1/2021 | | |
| WO | WO-2021001272 A1 * | 1/2021 | .............. | H04W 4/08 |

OTHER PUBLICATIONS

International Search Report dated Nov. 1, 2022 in International Application No. PCT/US 22/36285.

(Continued)

*Primary Examiner* — Kenneth R Coulter
(74) *Attorney, Agent, or Firm* — Sughrue Mion, PLLC (57) ABSTRACT

A method, computer program, and computer system for enabling peer-to-peer media streaming using service enabler architecture layer (SEAL). The method may be executed by one or more processors, and the method may include receiving, by a vertical application layer (VAL) server, a request for a media session negotiation between one or more client devices, and retrieving, by the vertical application layer (VAL) server, transport layer information associated with each of the one or more client devices using network address translation traversal. The method may further include transmitting, by the vertical application layer (VAL) server, agreed session description protocol (SDP) parameters based on the transport layer information, wherein the agreed session description protocol (SDP) parameters are used to establish a peer-to-peer media streaming session.

20 Claims, 4 Drawing Sheets

(51) Int. Cl.
  *H04L 65/1104* (2022.01)
  *H04L 65/61* (2022.01)
  *H04L 67/104* (2022.01)

(58) Field of Classification Search
  USPC .................................. 709/227, 228, 230, 203
  See application file for complete search history.

(56) References Cited

OTHER PUBLICATIONS

Written Opinion dated Nov. 1, 2022 in International Application No. PCT/US 22/36285.
Extended European Search Report dated Nov. 8, 2023 in European Application No. 22838366.7.
Jennings et al., "Real-Time Communications for the Web", IEEE Communications Magazine, Apr. 2013, pp. 20-26 (7 pages total).
3GPP, "3rd Generation Partnership Project; Technical Specification Group Services and System Aspects; Service Enabler Architecture Layer for Verticals (SEAL); Functional architecture and information flows; (Release 17)", 3GPP TS 23.434 V17.2.0 (Jun. 2021), 2021, pp. 1-165 (165 pages total).
Tencent, "Enable VAL server for Peer-to-Peer media parameter negotiation.", 3GPP TSG-SA WG6 Meeting #44, S6-211636, e-meeting, Jul. 12-Jul. 20, 2021 (4 pages total).

\* cited by examiner

ENABLING VERTICAL APPLICATION LAYER SERVER FOR PEER-TO-PEER MEDIA PARAMETER NEGOTIATION

CROSS-REFERENCE TO RELATED APPLICATION

This application claims priority from U.S. Provisional Patent Application No. 63/219,306, filed on Jul. 7, 2021, in the U.S. Patent and Trademark Office, the entirety of which is incorporated herein.

FIELD

The present disclosure relates to enabling peer-to-peer media parameter negotiation and communication. More particularly, the present disclosure relates to the design and operation of Service Enabler Architecture Layer for verticals (SEAL) to enable vertical application layer (VAL) server for Peer-to-Peer (P2P) media parameter negotiation.

BACKGROUND

A service enabler architecture layer (SEAL) may be used over 3GPP wireless networks to support vertical (VAL) applications (e.g., UAV, V2X applications). The SEAL functional architecture may include common application plane and signaling plane entities. A set of common services (e.g., group management, configuration management, location management) specified in this document can be shared across vertical applications.

With Peer-to-peer (P2P) media streaming technology becoming a promising media streaming method, methods of reducing the cost of a centralized media server and communication delays are needed.

SUMMARY

Embodiments relate to a method, system, and computer readable medium for enabling peer-to-peer media streaming using service enabler architecture layer (SEAL). According to one aspect, a method for enabling peer-to-peer media streaming using service enabler architecture layer (SEAL) may be provided. The method may be executed by one or more processors, and the method may include receiving, by a vertical application layer (VAL) server, a request for a media session negotiation between one or more client devices, and retrieving, by the vertical application layer (VAL) server, transport layer information associated with each of the one or more client devices using network address translation traversal. The method may further include transmitting, by the vertical application layer (VAL) server, agreed session description protocol (SDP) parameters based on the transport layer information, wherein the agreed session description protocol (SDP) parameters are used to establish a peer-to-peer media streaming session.

According to another aspect, an apparatus for enabling peer-to-peer media streaming using service enabler architecture layer (SEAL) may be provided. The apparatus may include at least one memory configured to store computer program code; and at least one processor configured to access the at least one memory and operate as instructed by the computer program code. The program code may include request receiving code configured to cause at least one processor to receive, by a vertical application layer (VAL) server, a request for a media session negotiation between one or more client devices; retrieving code configured to cause at least one processor to retrieve, by the vertical application layer (VAL) server, transport layer information associated with each of the one or more client devices using network address translation traversal; and transmitting code configured to cause at least one processor to transmit, by the vertical application layer (VAL) server, agreed session description protocol (SDP) parameters based on the transport layer information, wherein the agreed session description protocol (SDP) parameters are used to establish a peer-to-peer media streaming session.

According to yet another aspect, a non-transitory computer readable medium storing instructions for enabling peer-to-peer media streaming using service enabler architecture layer (SEAL) may be provided. The instructions may include one or more instructions that, when executed by one or more processors, cause the one or more processors to receive, by a vertical application layer (VAL) server, a request for a media session negotiation between one or more client devices; retrieve, by the vertical application layer (VAL) server, transport layer information associated with each of the one or more client devices using network address translation traversal; and transmit, by the vertical application layer (VAL) server, agreed session description protocol (SDP) parameters based on the transport layer information, wherein the agreed session description protocol (SDP) parameters are used to establish a peer-to-peer media streaming session.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Figure 1:
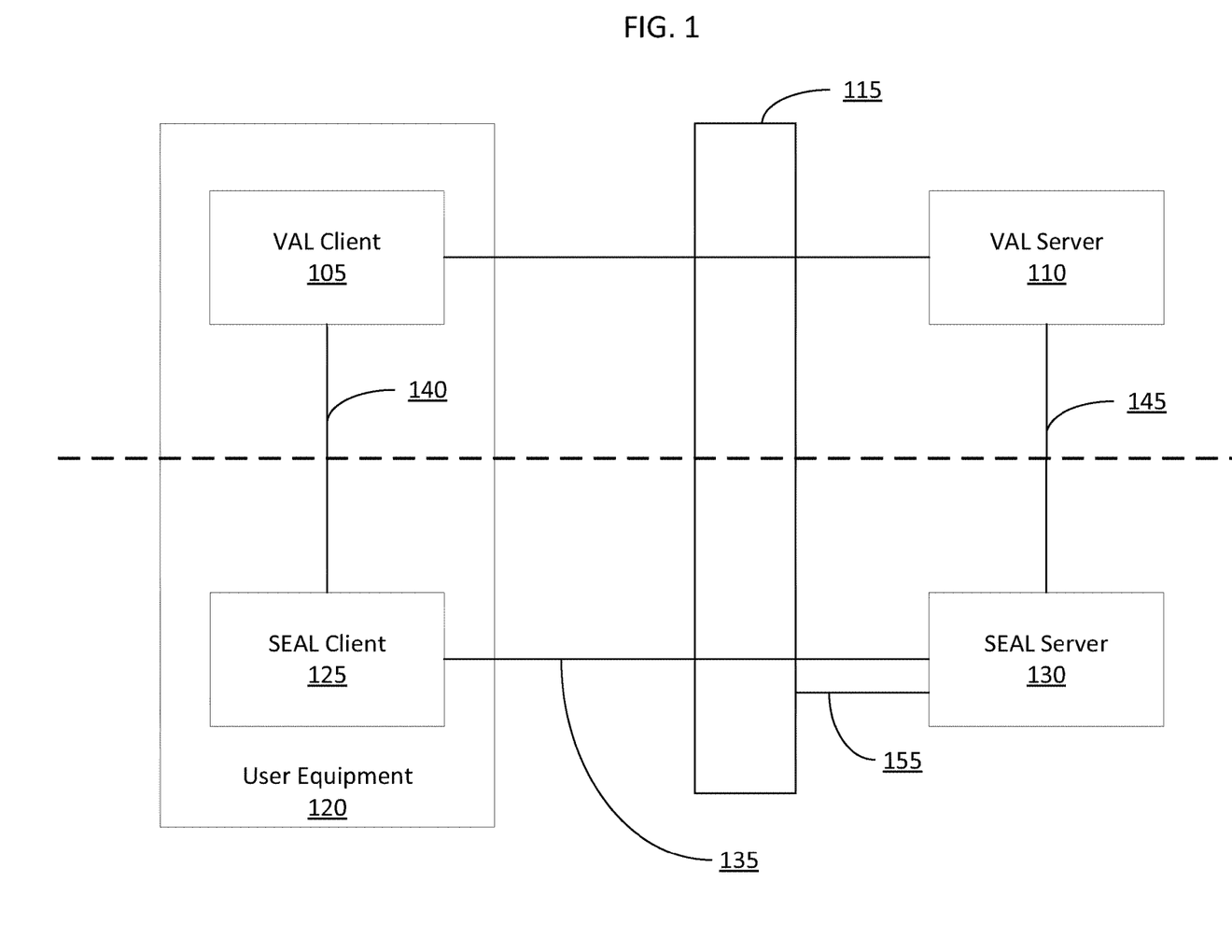
FIG. 1 illustrates an exemplary functional architecture of Service Enabler Architecture Layer of verticals (SEAL)

FIG. 1 illustrates an exemplary Service Enabler Architecture Layer of verticals (SEAL) functional architecture 100 for enabling peer-to-peer media streaming. As shown in FIG. 1, SEAL functional architecture 100 may include a vertical application layer (VAL) client 105, a VAL server 110, a SEAL server 130, a SEAL client 125, one or more VAL-UU reference points 115, one or more SEAL-UU reference points 135, and user equipment 120.

According to an embodiment of the present disclosure, the VAL client 105 may communicate with the VAL server 110 over one or more VAL-UU reference points 115. VAL-UU 115 may support both unicast and multicast delivery modes.

The SEAL functional entities on the user equipment 120 and the SEAL server 130 are grouped into SEAL client 125 and SEAL server 130 respectfully. The SEAL functionalities consists of a common set of services (e.g., group management, location management) and reference points. The SEAL functionalities may provide its services to the vertical application layer (VAL).

The SEAL client 125 may communicate the SEAL server 130 over one or more of the SEAL-UU 135 reference points. The one or more SEAL-UU 135 may support both unicast and multicast delivery modes. The SEAL client 125 may provide the service enabler layer support functions to the VAL client 105 over one or more SEAL-C reference points 140. The VAL server 110 may communicate with the SEAL server 130 over one or more SEAL-S reference points 145. The SEAL server 130 may communicate with the underlying 3GPP network systems using the respective 3GPP interfaces specified by the 3GPP network system.

According to embodiments, specific SEAL clients and specific SEAL servers along with their specific SEAL-UU reference points and the specific network interfaces of 3GPP network system used may be described in the respective on-network functional model for each SEAL service.

The VAL client 105 may provide the client-side functionalities corresponding to the vertical applications (e.g., UAV, V2X client). The VAL client may support interactions with the SEAL client 125. The VAL server 110 may provide the server-side functionalities corresponding to the vertical applications (e.g., UAV, V2X application servers).

The SEAL client 125 may provide the client-side functionalities corresponding to the specific SEAL service. The SEAL client 125 may support interactions with the VAL client 105. The SEAL client may also support interactions with the corresponding SEAL client between one or more user equipment.

The SEAL server 130 may provide the server-side functionalities corresponding to the specific SEAL service. The SEAL server 130 may support interactions with the VAL server 110.

According to embodiments, the SEAL functional architecture 100 takes into consideration the common capabilities to support mission critical and other vertical applications.

In some embodiments, the SEAL functional architecture 100 may provide the network resource management, and the network resource management client i.e., SEAL client 12, may act as the Val client 105 for the management of network resources. The network resource management client may interact with the network resource management server, i.e., SEAL server 130. The network resource management server may enable and allow management of 3GPP system network resources (e.g. unicast, multicast) to support the VAL client 105. The interactions related to network resource management functions between the network resource management client (SEAL client 125) and the network resource management server (SEAL server 130) may be supported by the one or more NRM-UU reference points 135. In some embodiments, The interactions related to network resource management functions between the VAL server 110 and the network resource management server (i.e., SEAL server 130) may be supported by one or more NRM-S reference points 145.

As an example, SDP used in SIP package may carry important information about media parameters may be sent from the VAL server 110 to network resource management using NRM-S:

```
v=0
o=Client1 2398026505 2307593197 IN IP4 100.200.130.140
s=Client1 Audio Session
b=AS:64
b=RS:800
b=RR:2400
c=IN IP4 10.11.12.13
t=0 0
m=audio 15010 RTP/AVP 0 101
a=rtpmap:0 PCMU/8000
a=rtpmap:101 telephone-event/8000
a=sendrecv
```

According to some embodiments, Peer-to-peer (P2P) media streaming technology, e.g., such as WebRTC, has been becoming a promising media streaming method. However, costs associated with a centralized media server need to be reduced and communication delays also need to be reduced. Using SEAL, with media payload in vertical application layers (VAL) (e.g., UASAPP and V2X), enabling P2P media parameter signaling is an essential step for establishing media sessions such as using session initiation protocol (SIP).

A key method of enabling media session communication, according to embodiments, may be to use network address translation (NAT) traversal techniques. As an example, techniques such as interactive connectivity establishment (ICE), session traversal utilities for NAT (STUN), traversal using relays around NAT (TURN), etc., may be used by a server to locate the IP addresses of all the peers. Session description protocol (SDP) is one of the protocols may be used for media session parameter negotiation.

Embodiments of the present disclosure relate to enabling the VAL server for P2P media parameters negotiation using existing SEAL signaling architecture such as NAT traversal offered by the NRM-S.

Figure 2:
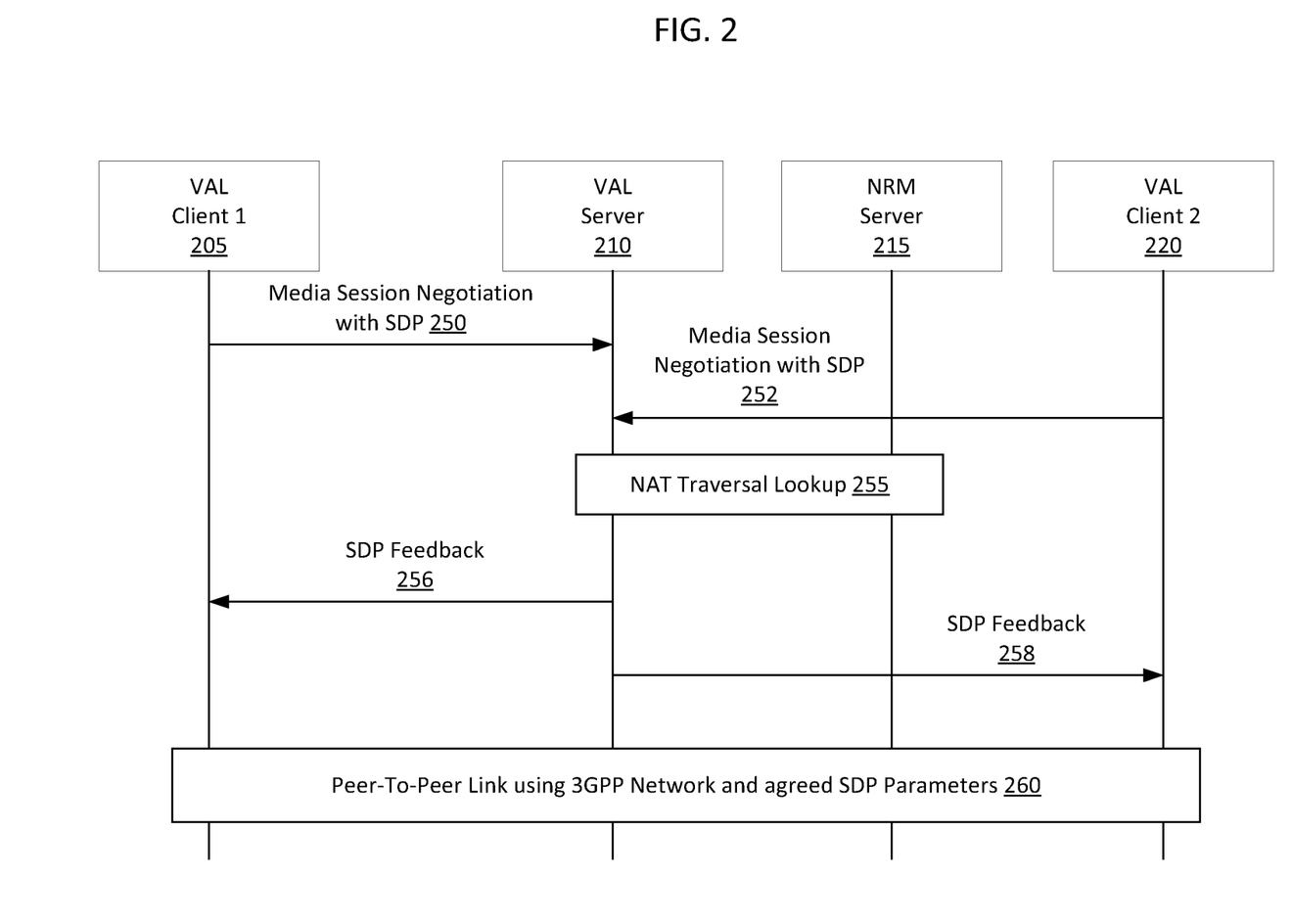
FIG. 2 illustrates an exemplary workflow for enabling peer-to-peer media streaming using service enabler architecture layer (SEAL)

FIG. 2 illustrates an exemplary workflow 200 for enabling peer-to-peer media streaming using service enabler architecture layer (SEAL). As shown in FIG. 2, workflow 200 may include a Val client 1 205, VAL client 2 220, VAL server 210, a network resource management (NRM) server 215, and a plurality of operations 250-260.

According to embodiments, the workflow 200 may disclose specifying media session parameters carried in SDP sent by multiple VAL clients being negotiated between the VAL client and the VAL server. The request may be sent from the VAL client, and may include the VAL user identification, user equipment ID and SDP offers. The VAL server may utilize the NRM server for media session signaling and may use NAT traversal techniques for retrieving transport layer information associated with the VAL clients. The VAL server may return the agreed SDP parameters for all the VAL clients. The VAL clients may then use the agreed SDP parameters to establish a peer-to-peer media streaming session.

At operations 250-252, VAL clients may send media session parameter negotiation requests to the VAL server. As an example, VAL client 1 205 and VAL client 2 220 may send media session parameter negotiation requests to the VAL server 210. In some embodiments, the VAL server 210 may pull or receive requests for media session parameter negotiation from VAL client 1 205 and VAL client 2 220. In some embodiments, the media session parameter negotiation requests ay include an identity of the requestor, a VAL user ID, a Val user equipment ID, and/or an SDP offer, as indicated in Table 1.

TABLE 1

Media Session Negotiation Request

| Information element | Status | Description |
| --- | --- | --- |
| Requester Identity | M | The identity of the VAL user or VAL UE performing the request. |
| VAL user ID or VAL UE ID | M | The identity of the VAL user or VAL UE. |
| SDP offer | M | SDP of the media parameters offered from a VAL client media payload |

At operation 255, the VAL server may use a network resource management (NRM) server to locate the transport layer information for the VAL clients. The transport layer information may include the IP and port numbers for each connecting peer (e.g., VAL client) as specified by the SDP. The NRM server may utilize NAT traversal capabilities and return the transport layer information of each peer back to the VAL server. As an example, VAL server 210 may retrieve transport layer information of each VAL client 1 205 and VAL client 2 220 from the NRM server 215 using NAT traversal capabilities. In some embodiments, the VAL server may consolidate the transport layer information from the NRM server and send back the agreed SDP parameters to each peer. The SDP parameter or SDP feedback may include parameters as disclosed in Table 2.

TABLE 2

Media Session Negotiation Response

| Information element | Status | Description |
| --- | --- | --- |
| SDP feedback | M | SDP of the media parameters feedback (codec, ICE candidates, media types and etc) |

At operations 256-258, the retrieved transport layer information and/or the agreed SDP parameters may be transmitted to each requesting VAL client. As an example, the parameters, as disclosed below, may be transmitted from VAL server 210 to VAL client 1 205 and VAL client 2 220. As an example, the returned ICE Candidates list the IP addresses of other peers.

TABLE 4

Agreed SDP Parameters or Agreed SDP Feedback

| Parameter Name | Example Value |
| --- | --- |
| Global Lines | o=-4611731400430051336 2 IN IP4 127.0.0.1 |
| | s=-t=0 0 |
| | a=group:BUNDLE 0 1 |
| | a=msid-semantic: WMS lgsCFqt9kN2fVKw5wg3NKqGdATQoltEwOdMS |
| Audio Lines | m=audio 58779 UDP/TLS/RTP/SAVPF 111 103 104 9 0 8 106 105 13 126 |
| | c=IN IP4 217.130.243.155 |
| | a=rtcp:51472 IN IP4 217.130.243.155 |
| ICE Candidates | a=candidate:1467250027 1 udp 2122260223 192.168.0.196 46243 typ host generation |
| Codec Parameters | a=rtpmap:111 opus/48000/2 |
| SSRC Parameters | a=ssrc:3570614608 cname:4TOk42mSjXCkVIa6a=ssrc:3570614608 msid:lgsCFqt9kN2fVKw5wg3NKqGdATQoltEwOdMS 35429d94-5637-4686-9ecd-7d0622261ce8a=ssrc:3570614608 mslabel:lgsCFqt9kN2fVKw5wg3NKqGdATQoltEwOdMSa=ssrc:3570614608 label:35429d94-5637-4686-9ecd-7d0622261ce8 |
| Video Lines | m=video 60372 UDP/TLS/RTP/SAVPF 100 101 116 117 96c=IN IP4 217.130.243.155a=rtcp:64891 IN IP4 217.130.243.155 |
| ICE Candidates | a=candidate:1467250027 1 udp 2122260223 192.168.0.196 56143 typ host generation 0 |
| | a=ice-ufrag:Oyef7uvBlwafI3hT |
| DTLS Parameters | a=fingerprint:sha-256 49:66:12:17:0D:1C:91:AE:57:4C:C6:36:DD:D5:97:D2:7D:62:C9:9A:7F:B9:A3:F4:70:03:E7:43:91:73:23:5E... |
| Codec Parameters | a=rtpmap:100 VP8/90000 |
| SSRC Parameters | a=ssrc-group:FID 2231627014 632943048 |

At operation 260, each peer may the transport layer information to establish a P2P media streaming session. As an example, at operation 260, VAL client 1 205 and VAL client 2 220 may establish a P2P media streaming session using the transport layer information.

Operations 250-252, and 256-258 may be performed in any order. The present disclosure discloses but does not limit the order or operations 250-260.

According to an embodiment, a P2P media streaming technology (e.g., WebRTC) may be used. WebRTC is a collection of communication protocols and utilizing webRTC may include 4 major steps: Signaling (e.g., using SDP), Connecting (e.g., using NAT traversal with STUN/TURN server or ICE agent for each peer), Securing (e.g., DTLS, SRTP), and Communicating (e.g., using RTP for media data or SCTP).

The P2P media streaming technology may use an offer/answer model. The model may include an agent being configured to make an "Offer" to start a call, and the other agents "Answers" if they are willing to accept what has been offered, giving the answerer a chance to reject offer (e.g., rejecting offer because of unsupported codecs in the Media Descriptions). The offer/answer model of some P2P media streaming technologies may enable two peers to understand what formats they are willing to exchange. As an example, transceivers are a WebRTC specific concept that may be seen in its application programming interface (API). The transceivers may expose the "Media Description" to the JavaScript API. Each Media Description may become a Transceiver. Thus, every time a transceiver is created, a new Media Description may be added to the local Session Description. Each Media Description in WebRTC may have a direction attribute. The direction attribute may allow a WebRTC Agent to declare "I am going to send you this codec, but I am not willing to accept anything back."

According to embodiments, WebRTC signaling using SDP may contain the following parameters as disclosed in Table 3.

peer may also need to know the public IP address of each peer since each peer may be behind a firewall. According to embodiments, the VAL server may be enabled to perform a P2P media negotiation by utilizing the SEAL NRM server.

Figure 3:
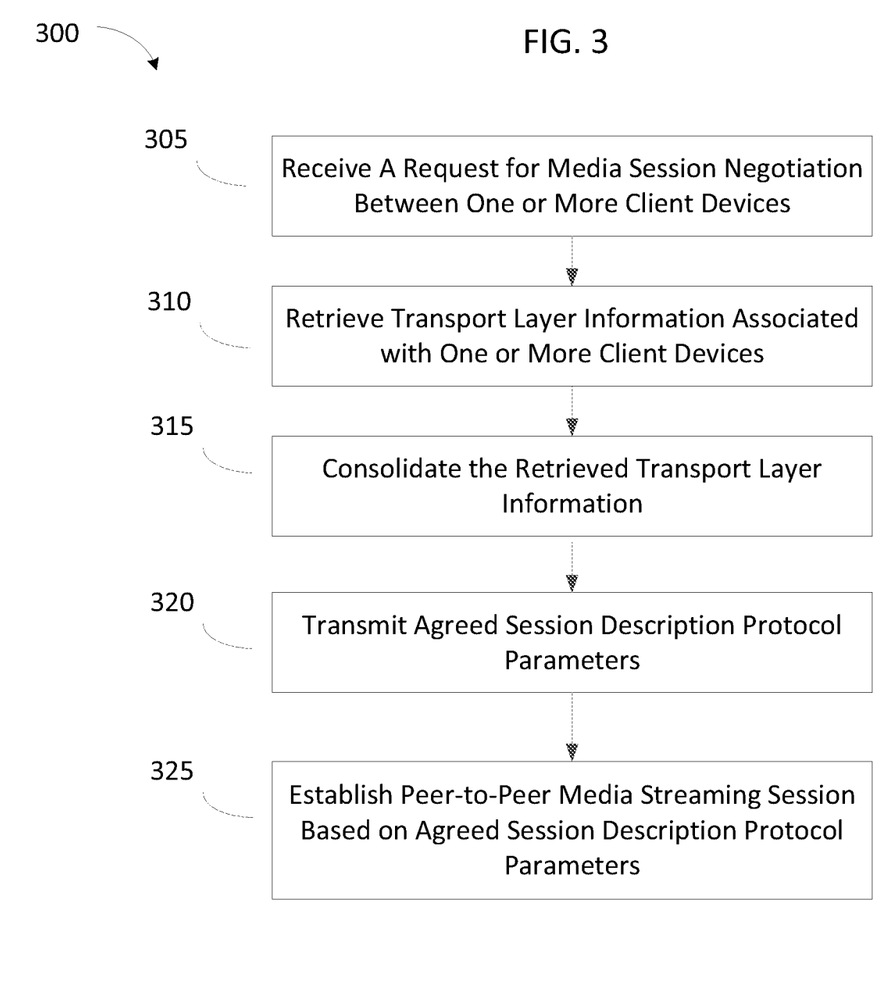
FIG. 3 illustrates an exemplary flowchart for enabling peer-to-peer media streaming using service enabler architecture layer (SEAL)

FIG. 3 illustrates an exemplary flowchart 300 for enabling peer-to-peer media streaming using service enabler architecture layer (SEAL).

As seen in operation 305, a VAL server may receive a request for a media session negotiation between one or more client devices. As an example, VAL server 210 may receive requests from VAL client 1 205 and VAL client 2 220.

As seen in operation 310, the VAL server may retrieve transport layer information associated with each of the one or more client devices using network address translation traversal. The VAL server may retrieve the transport layer information associated with each of the one or more client devices from a network resource management server. As an example, VAL server 210 may retrieve transport layer information associated with each of the one or more client devices using network address translation traversal from the NRM server 215.

In some embodiments, the transport layer information may include one or more of respective IP addresses and respective port numbers associated each of the one or more client devices. In some embodiments, the VAL server may retrieve the agreed session description protocol (SDP) parameters. The agreed session description protocol (SDP) parameters may include one or more of accepted codecs, interactive connectivity establishment candidates, media types, available codec support, and bandwidth. In some embodiments, the agreed session description protocol (SDP) parameters may further include one or more of multiple synchronization sources, and parameters required by management protocols.

As seen in operation 315, the VAL server may consolidate the retrieved transport layer information associated with

TABLE 3

Parameters for WebRTC Signaling using SDP

| | | |
|---|---|---|
| group: BUNDLE | running multiple types of traffic over one connection. | |
| fingerprint: sha-256 | a hash of the certificate a peer is using for DTLS | |
| setup | This controls the DTLS Agent behavio | setup: active - Run as DTLS Client. setup: passive - Run as DTLS Server. setup: actpass - Ask the other WebRTC Agent to choose. |
| ice-ufrag | user fragment value for the ICE Agent to authentication of ICE Traffic. | |
| ice-pwd | password for the ICE Agent | |
| rtpmap | map a specific codec to an RTP Payload Type. Payload types are not static, so for every call the offerer decides the payload types for each codec. | Such as audio/video |
| fmtp | communicate a specific video profile or encoder setting. | Such as VVC specific codec profile, layers . . . |
| candidate | an ICE Candidate that comes from the ICE Agen | Could be multiple lines |
| ssrc | A Synchronization Source (SSRC) defines a single media stream track. | |

For P2P media communication, each peer may need to know the capacity and capability of each peers' offering. Capacity and capability may include CODEC support and bandwidth. To establish a P2P media streaming session, each each of the one or more client devices. In some embodiments, the VAL server may consolidate the retrieved transport layer information associated with each of the one or more client devices and the agreed SDP parameters. In some embodiments, the VAL server may consolidate information prior to transmitting the agreed session description protocol (SDP) parameters.

As seen in operation 320, the VAL server may transmit the agreed session description protocol (SDP) parameters based on the transport layer information, wherein the agreed session description protocol (SDP) parameters are used to establish a peer-to-peer media streaming session. As an example, VAL server 210 may transmit the agreed session description protocol (SDP) parameters that VAL client 1 205 and VAL client 2 220 may use to establish a P2P media streaming session.

As seen in operation 325, the one or more client devices may establish the peer-to-peer media streaming session based on the transport layer information associated with each of the one or more client devices and the agreed session description protocol (SDP) parameters. As an example, VAL client 1 205 and VAL client 2 220 may establish a P2P media streaming session between themselves.

Figure 4:
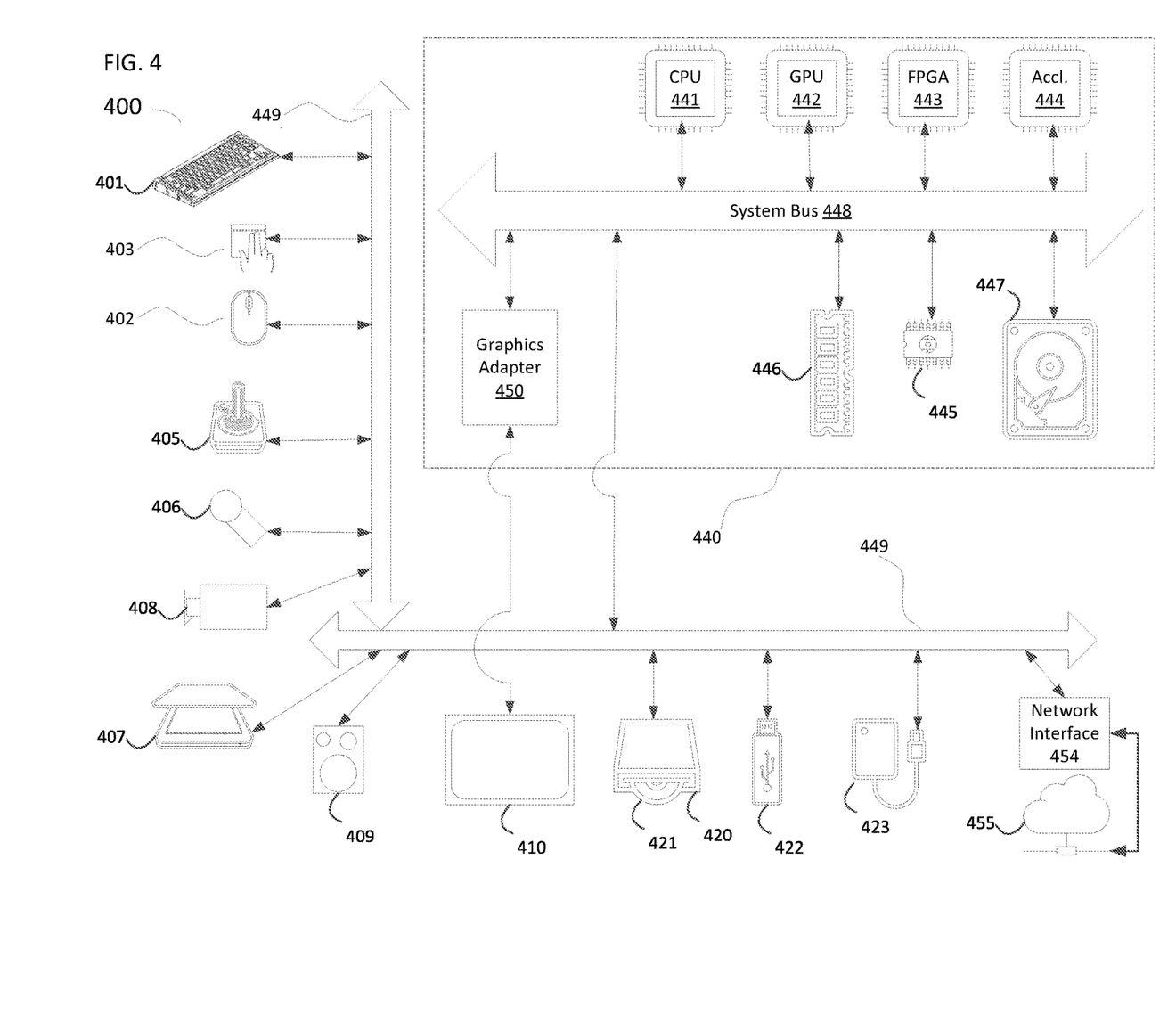
FIG. 4 illustrates an exemplary computer system enabling peer-to-peer media streaming using service enabler architecture layer (SEAL).

The components shown in FIG. 4 for computer system 400 may be used to implement any of the devices disclosed in FIGS. 1-3, and are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 400.

Computer system 400 may include certain human interface input devices. Such a human interface input device may be responsive to input by one or more human users through, for example, tactile input (such as keystrokes, swipes, data glove movements), audio input (such as voice, clapping), visual input (such as gestures), olfactory input (not depicted). The human interface devices can also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 401, mouse 402, trackpad 403, touch screen 410, data-glove (not depicted), joystick 405, microphone 406, scanner 407, camera 408.

Computer system 400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 410, data-glove (not depicted), or joystick 405, but there can also be tactile feedback devices that do not serve as input devices), audio output devices (such as speakers 409, headphones (not depicted)), visual output devices (such as screens 410 to include CRT screens, LCD screens, plasma screens, OLED screens, each with or without touch-screen input capability, each with or without tactile feedback capability—some of which may be capable to output two-dimensional visual output or more than three-dimensional output through means such as stereographic output; virtual-reality glasses (not depicted), holographic displays and smoke tanks (not depicted)), and printers (not depicted).

Computer system 400 can also include human accessible storage devices and their associated media such as optical media including CD/DVD ROM/RW 420 with CD/DVD or the like media 421, thumb-drive 422, removable hard drive or solid-state drive 423, legacy magnetic media such as tape and floppy disc (not depicted), specialized ROM/ASIC/PLD based devices such as security dongles (not depicted), and the like.

Those skilled in the art should also understand that term "computer-readable media" as used in connection with the presently disclosed subject matter does not encompass transmission media, carrier waves, or other transitory signals.

Computer system 400 can also include an interface to one or more communication networks. Networks can, for example, be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 5G, 5G, LTE and the like, TV wireline or wireless wide-area digital networks to include cable TV, satellite TV, and terrestrial broadcast TV, vehicular and industrial to include CANBus, and so forth. Certain networks commonly require external network interface adapters that attached to certain general-purpose data ports or peripheral buses (449) (such as, for example, USB ports of the computer system 400; others are commonly integrated into the core of the computer system 400 by attachment to a system bus as described below (for example Ethernet interface into a PC computer system or cellular network interface into a smartphone computer system). Using any of these networks, computer system 400 can communicate with other entities. Such communication can be uni-directional, receive only (for example, broadcast TV), uni-directional send-only (for example, CANbus to certain CANbus devices), or bi-directional, for example to other computer systems using local or wide area digital networks. Certain protocols and protocol stacks can be used on each of those networks and network interfaces, as described above.

The aforementioned human interface devices, human-accessible storage devices, and network interfaces can be attached to a core 440 of the computer system 400.

The core 440 can include one or more Central Processing Units (CPU) 441, Graphics Processing Units (GPU) 442, specialized programmable processing units in the form of Field Programmable Gate Areas (FPGA) 443, hardware accelerators for certain tasks 444, and so forth. These devices, along with Read-only memory (ROM) 445, Random-access memory 446, internal mass storage such as internal non-user accessible hard drives, SSDs, and the like 447, may be connected through a system bus 448. In some computer systems, the system bus 448 can be accessible in the form of one or more physical plugs to enable extensions by additional CPUs, GPU, and the like. The peripheral devices can be attached either directly to the core's system bus 448, or through a peripheral bus 449. Architectures for a peripheral bus include PCI, USB, and the like.

CPUs 441, GPUs 442, FPGAs 443, and accelerators 444 can execute certain instructions that, in combination, can make up the aforementioned computer code. That computer code can be stored in ROM 445 or RAM 446. Transitional data can be also be stored in RAM 446, whereas permanent data can be stored, for example, in the internal mass storage 447. Fast storage and retrieval to any of the memory devices can be enabled through the use of cache memory, which can be closely associated with one or more CPU 441, GPU 442, mass storage 447, ROM 445, RAM 446, and the like.

The computer-readable media can have computer code thereon for performing various computer-implemented operations. The media and computer code can be specially designed and constructed for the purposes of the present disclosure, or they can be of the kind well known and available to those having skill in the computer software arts.

As an example and not by way of limitation, the computer system having architecture 400, and specifically the core 440 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 440 that are of non-transitory nature, such as core-internal mass storage 447 or ROM 445. The software implementing various embodiments of the present disclosure can be stored in such devices and executed by core 440. A computer-readable medium can include one or more memory devices or chips, according to particular needs. The software can cause the core 440 and specifically the processors therein (including CPU, GPU, FPGA, and the like) to execute particular processes or particular parts of particular processes described herein, including defining data structures stored in RAM 446 and modifying such data structures according to the processes defined by the software. In addition or as an alternative, the computer system can provide functionality as a result of logic hardwired or otherwise embodied in a circuit (for example, accelerator 444), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enabling peer-to-peer media streaming using service enabler architecture layer (SEAL), the method being executed by one or more processors, the method comprising:
   receiving, by a vertical application layer (VAL) server, a request for a media session negotiation between one or more client devices;
   retrieving, by the vertical application layer (VAL) server, transport layer information associated with each of the one or more client devices using network address translation traversal; and
   transmitting, by the vertical application layer (VAL) server, agreed session description protocol (SDP) parameters based on the transport layer information, wherein the agreed session description protocol (SDP) parameters are used to establish a peer-to-peer media streaming session and comprise a plurality of parameters indicating CODEC support and bandwidth, audio lines, video lines, interactive connectivity establishment (ICE), datagram transport layer security (DTLS), and synchronization source (SSRC).

2. The method of claim 1, wherein the request comprises at least one of a requestor identifier, an identification associated with a VAL user, a user equipment identifier, and a session description protocol (SDP) offer.

3. The method of claim 1, wherein the transport layer information comprises one or more of respective IP addresses and respective port numbers associated each of the one or more client devices.

4. The method of claim 1, wherein prior to transmitting the agreed session description protocol (SDP) parameters, the method comprises, consolidating, by the vertical application layer (VAL) server, the transport layer information associated with each of the one or more client devices.

5. The method of claim 1, wherein the agreed session description protocol (SDP) parameters include one or more of accepted codecs, interactive connectivity establishment candidates, media types, available codec support, and bandwidth.

6. The method of claim 5, wherein the agreed session description protocol (SDP) parameters further include one or more of multiple synchronization sources, and additional parameters required by management protocols.

7. The method of claim 1, wherein the method further comprises:
   establishing, by the one or more client devices, the peer-to-peer media streaming session based on the transport layer information associated with each of the one or more client devices and the agreed session description protocol (SDP) parameters.

8. An apparatus for enabling peer-to-peer media streaming using service enabler architecture layer (SEAL), the apparatus comprising:
   at least one memory configured to store computer program code; and
   at least one processor configured to access the at least one memory and operate as instructed by the computer program code, the computer program code including:
   request receiving code configured to cause the at least one processor to receive, by a vertical application layer (VAL) server, a request for a media session negotiation between one or more client devices;

retrieving code configured to cause the at least one processor to retrieve, by the vertical application layer (VAL) server, transport layer information associated with each of the one or more client devices using network address translation traversal; and transmitting code configured to cause the at least one processor to transmit, by the vertical application layer (VAL) server, agreed session description protocol (SDP) parameters based on the transport layer information, wherein the agreed session description protocol (SDP) parameters are used to establish a peer-to-peer media streaming session and comprise a plurality of parameters indicating CODEC support and bandwidth, audio lines, video lines, interactive connectivity establishment (ICE), datagram transport layer security (DTLS), and synchronization source (SSRC).

9. The apparatus of claim 8, wherein the request comprises at least one of a requestor identifier, an identification associated with a VAL user, a user equipment identifier, and a session description protocol (SDP) offer.

10. The apparatus of claim 8, wherein the transport layer information comprises one or more of respective IP addresses and respective port numbers associated each of the one or more client devices.

11. The apparatus of claim 8, wherein the computer program code is configured to cause the at least one processor, prior to transmitting the agreed session description protocol (SDP) parameters, to consolidate, by the vertical application layer (VAL) server, the transport layer information associated with each of the one or more client devices.

12. The apparatus of claim 8, wherein the agreed session description protocol (SDP) parameters include one or more of accepted codecs, interactive connectivity establishment candidates, media types, available codec support, and bandwidth.

13. The apparatus of claim 12, wherein the agreed session description protocol (SDP) parameters further include one or more of multiple synchronization sources, and additional parameters required by management protocols.

14. The apparatus of claim 8, wherein the computer program code is configured to cause the at least one processor to establish, by the one or more client devices, the peer-to-peer media streaming session based on the transport layer information associated with each of the one or more client devices and the agreed session description protocol (SDP) parameters.

15. A non-transitory computer-readable medium storing instructions for enabling peer-to-peer media streaming using service enabler architecture layer (SEAL), the instructions comprising: one or more instructions that, when executed by one or more processors, cause the one or more processors to:

receive, by a vertical application layer (VAL) server, a request for a media session negotiation between one or more client devices;

retrieve, by the vertical application layer (VAL) server, transport layer information associated with each of the one or more client devices using network address translation traversal; and transmit, by the vertical application layer (VAL) server, agreed session description protocol (SDP) parameters based on the transport layer information, wherein the agreed session description protocol (SDP) parameters are used to establish a peer-to-peer media streaming session and comprise a plurality of parameters indicating CODEC support and bandwidth, audio lines, video lines, interactive connectivity establishment (ICE), datagram transport layer security (DTLS), and synchronization source (SSRC).

16. The non-transitory computer-readable medium of claim 15, wherein the request comprises at least one of a requestor identifier, an identification associated with a VAL user, a user equipment identifier, and a session description protocol (SDP) offer.

17. The non-transitory computer-readable medium of claim 15, wherein the transport layer information comprises one or more of respective IP addresses and respective port numbers associated each of the one or more client devices.

18. The non-transitory computer-readable medium of claim 15, wherein prior to transmitting the agreed session description protocol (SDP) parameters, the one or more instructions that, when executed by the one or more processors, further cause the one or more processors to consolidate, by the vertical application layer (VAL) server, the transport layer information associated with each of the one or more client devices.

19. The non-transitory computer-readable medium of claim 15, wherein the agreed session description protocol (SDP) parameters include one or more of accepted codecs, interactive connectivity establishment candidates, media types, available codec support, and bandwidth.

20. The non-transitory computer-readable medium of claim 15, wherein the agreed session description protocol (SDP) parameters further include one or more of multiple synchronization sources, and additional parameters required by management protocols.

* * * * *